United States Patent [19]

Toyama et al.

[11] Patent Number: 4,636,997
[45] Date of Patent: Jan. 13, 1987

[54] ULTRASONIC TRANSDUCER

[75] Inventors: Keiichiro Toyama, Nishio; Masao Kodera, Okazaki; Kunihiko Sasaki, Nukata, all of Japan

[73] Assignee: Nippon Soken, Inc., Nishio, Japan

[21] Appl. No.: 697,006

[22] Filed: Jan. 31, 1985

[30] Foreign Application Priority Data

Feb. 17, 1984 [JP] Japan .................. 59-29333

[51] Int. Cl.⁴ .............................................. H04R 1/20
[52] U.S. Cl. ..................... 367/140; 367/909; 181/104; 181/206; 340/904; 73/632
[58] Field of Search ............... 367/140, 151, 909, 162, 367/165, 905; 181/206, 104; 340/904; 73/632, 627, 629, 642

[56] References Cited

U.S. PATENT DOCUMENTS 4,433,398 2/1984 Kodera et al. ............... 367/140
4,581,685 4/1986 Kago et al. .................. 367/140

FOREIGN PATENT DOCUMENTS 0218295 12/1983 Japan .
0039196 3/1984 Japan .
0039197 3/1984 Japan .
0039193 3/1984 Japan .

Primary Examiner—Charles T. Jordan
Assistant Examiner—John W. Eldred
Attorney, Agent, or Firm—Cushman, Darby & Cushman

[57] ABSTRACT

An ultrasonic transducer comprises a cylindrical housing embedded within a rear bumper of a vehicle and opening backward, a reflecting plate having a parabolic reflecting surface provided within the cylindrical housing along a closed end thereof and facing an open end thereof, and an ultrasonic vibrator provided in an upper wall of the housing at the focus of the reflecting plate for emitting and receiving ultrasonic waves. The ultrasonic transducer transmits ultrasonic waves behind the vehicle and receives ultrasonic waves reflected from an obstacle. The ultrasonic transducer further comprises a projecting member provided on the inner wall of the housing along the open end thereof for dispersing and cancelling the ultrasonic waves entering the housing at angles with respect to the axis of the housing. The projecting member has a smoothly curving cross section having a radius of substantially one fourth to five times the wavelength of the ultrasonic waves emitted by the ultrasonic vibrator.

10 Claims, 6 Drawing Figures

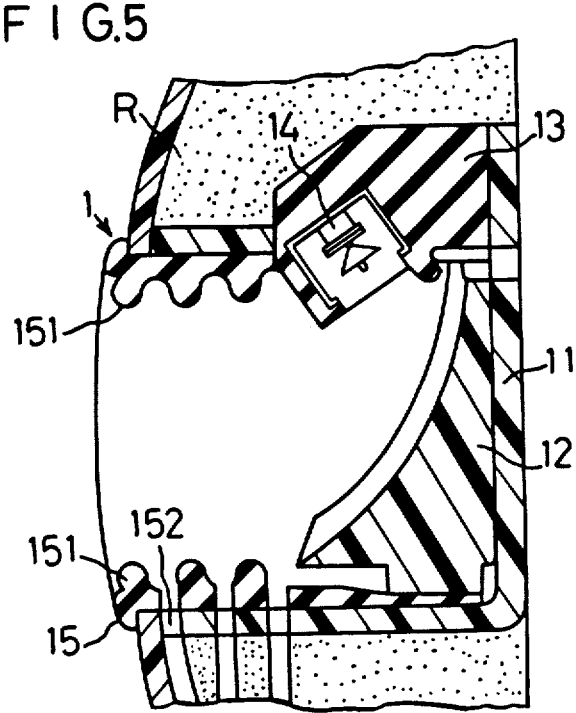
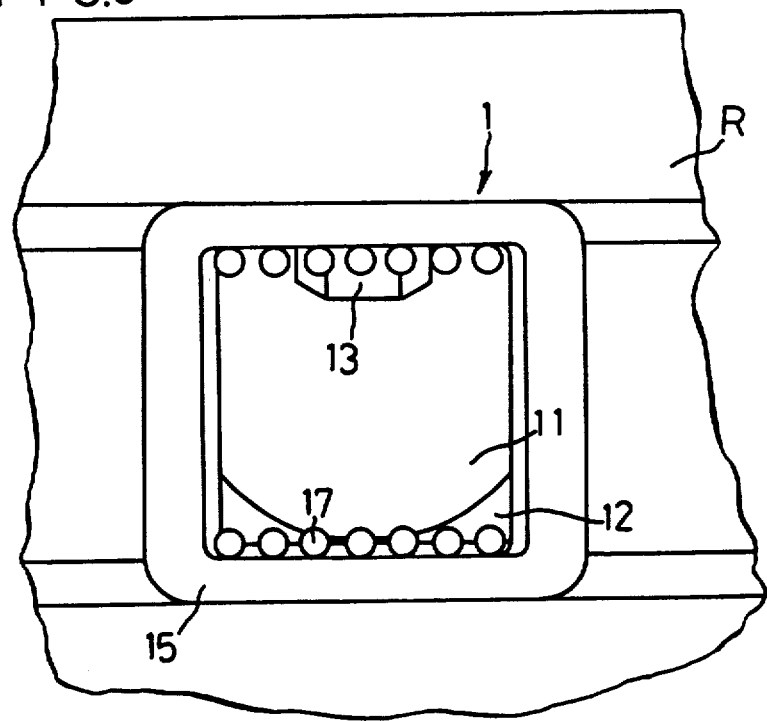

ULTRASONIC TRANSDUCER

BACKGROUND OF THE INVENTION

The present invention relates to an ultrasonic transducer used in a device for detecting obstacles ahead or behind a vehicle.

Recently, an obstacle detecting device for guarding the backward movement of a vehicle, which employs an ultrasonic transducer, has been proposed.

In the obstacle detecting device, the ultrasonic transducer is installed in the rear of the vehicle, especially in a rear bumper thereof. The ultrasonic transducer transmits ultrasonic waves behind the vehicle and receives the ultrasonic waves reflected from an obstacle to which the rear of the vehicle approaches and of which a driver does not become aware. Then, the obstacle detecting circuit detects the distance between the vehicle and the obstacle by measuring the time taken until the reflected waves return from the obstacle.

The ultrasonic transducer used in the above described obstacle detecting device comprises an ultrasonic vibrator, and a reflecting in a horizontal direction plate for reflecting the ultrasonic waves emitted by the ultrasonic vibrator.

The ultrasonic transducer as described above is generally installed at a position near a road surface so that spattered muddy water or the like is liable to adhere to the ultrasonic vibrator and the reflecting plate, resulting in the lowering of the function of the ultrasonic transducer.

In order to prevent the spattered water or the like from adhering to the ultrasonic transducer, an attempt has been made to mount the ultrasonic vibrator and the reflecting plate within a cylindrical housing opening backward. However, this configuration has the following problem. Namely, one portion of the transmitted ultrasonic waves is reflected by a cylindrical wall of the housing and is fed out of the housing in a direction toward the road surface. Then, after being reflected by an object on the road surface, for example a tire stopping stone, the ultrasonic waves return to the housing and are repeatedly reflected by the cylindrical wall thereof to reach the ultrasonic vibrator. As a result, the obstacle detecting circuit misdetects an object on the road, for example a tire stopping stone, against which the rear of the vehicle does not collide, as an obstacle to be detected.

SUMMARY OF THE INVENTION

One object of the present invention is to provide an ultrasonic transducer suitably employed in the device for detecting obstacles behind a vehicle.

Another object of the present invention is to provide an ultrasonic transducer having a cylindrical housing for accomodating an ultrasonic vibrator and a reflecting plate, and reducing the reflection of the ultrasonic waves on a cylindrical wall of the housing so as to prevent the misdetection of obstacles.

Still another object of the present invention is to provide an ultrasonic transducer which prevents rain water or the like from adhering to the ultrasonic vibrator.

An ultrasonic transducer according to the present invention comprises a cylindrical housing having an open end and a closed end, an ultrasonic vibrator provided within the housing for emitting and receiving ultrasonic waves, a reflecting plate provided within the housing for reflecting ultrasonic waves emitted by the ultrasonic vibrator toward the open end of the housing and reflecting ultrasonic waves entering from outside toward the ultrasonic vibrator, and a projecting member provided on the inner wall of the housing. The projecting member is disposed at least along the open end of the housing and has a smoothly curved section along the axis of the housing.

By providing the projecting member, the ultrasonic waves entering the housing at selected angles with respect to the axis of the housing are dispersed and cancelled to improve the directivity of the ultrasonic transducer.

The ultrasonic transducer of the present invention may include a rain water stopping member projecting from the upper wall of the housing between the upper end of the reflecting plate and the ultrasonic vibrator so as to separate the reflecting plate and the ultrasonic vibrator from each other.

By providing the rain water stopping member, the rain water entering from the open end of the housing and rising along the reflecting surface can be stopped from turning toward the ultrasonic vibrator.

BRIEF DESCRIPTION OF THE DRAWINGS

FIG. 1 is a sectional view of the ultrasonic transducer installed in a rear bumper of a vehicle, which is taken along the line I—I of FIG. 2;

FIG. 2 is a front view of the ultrasonic transducer taken in the direction of the arrow A of FIG. 1;

FIGS. 3 and 4 are charts, each showing the directivity of the ultrasonic transducer;

FIG. 5 is a sectional view of a second embodiment of an ultrasonic transducer according to the present invention; and FIG. 6 is a front view of a third embodiment of an ultrasonic transducer according to the present invention.

DESCRIPTION OF THE PREFERRED EMBODIMENTS

Figure 1:
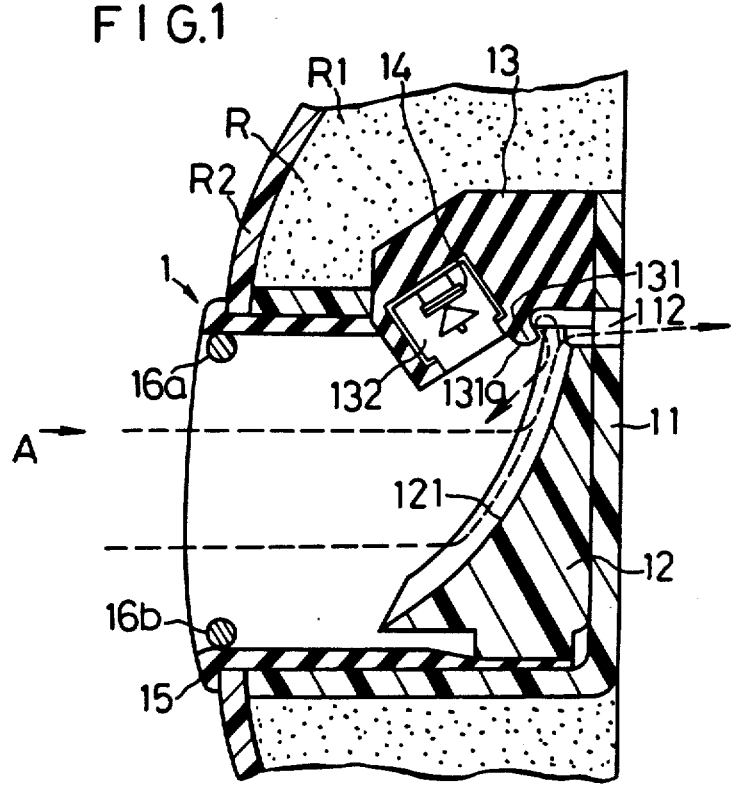
FIGS. 1 to 4 illustrate a first embodiment of an ultrasonic transducer according to the present invention.
Figure 2:
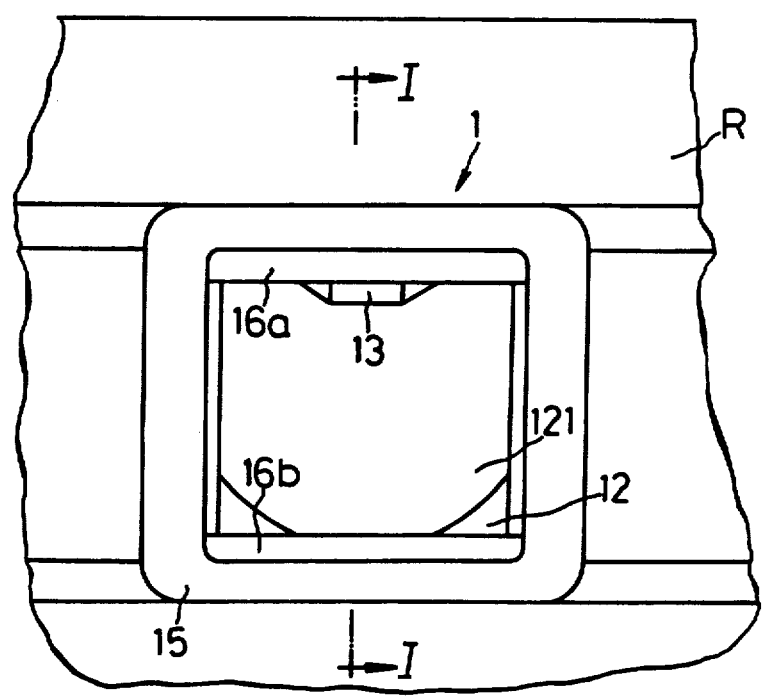

In FIG. 1, an ultrasonic transducer 1 is embedded within a rear bumper R of a vehicle, which bumper includes a foamed body $R_1$ and a cover member $R_2$ each being made of synthetic resin. The transducer 1 has a cylindrical shape having a rectangular section as shown in FIG. 2. The opening of the transducer 1 is positioned at the surface of the rear bumper R and directed behind a vehicle (leftward in FIG. 1). The transducer 1 is provided with a cylindrical housing 11 made of synthetic resin. An open end of the cylindrical housing 11 is fixed to the cover member $R_2$ of the bumper R by means of several screws (not shown). Within the housing 11 is accomodated a reflecting plate 12 along a closed end surface thereof. The reflecting plate 12 has a parabolic reflecting surface 121 and is positioned so that the lower portion thereof gradually extends toward the opening of the housing 11.

On the outer wall of the housing 11 is provided a retaining member 13 made of rubber so as to be exposed to the interior thereof. An ultrasonic vibrator 14 is disposed within a groove 132 formed in the retaining member 13 so as to be diagonally directed to the front of the vehicle. The ultrasonic vibrator is located at the focus of the reflecting surface 121.

A hole 112 is provided in the closed end surface of the housing 11 so as to extend in the width direction thereof along the upper edge of the reflecting plate 12 for draining water entering the housing 11. A rain water stopping member 131 projects from the retaining member 13 defining the groove 132 toward the upper edge of the reflecting plate 12. The stopping member 131 has a smoothly curved surface 131a facing the ultrasonic vibrator 14.

A cylindrical hood 15 made of rubber is fit into the housing 11 from the opening thereof.

Round rods 16a, 16b are secured to the upper and under walls of the opening end of the hood 15 so as to be opposed to each other thereby to form projecting members. The radius of the rods 16a, 16b is made from one fourth to five times the wavelength of the ultrasonic waves.

Since the reflecting surface 121 of the reflecting plate 12 is curved in the width direction thereof, the ultrasonic waves can be prevented from dispersing horizontally.

The ultrasonic vibrator 14 is connected to an obstacle detecting circuit installed in a vehicle by means of a lead wire (not shown).

The ultrasonic waves emitted by the ultrasonic vibrator 14 are reflected by the reflecting surface 121 and directed horizontally along the axial direction of the housing 11. Then, the ultrasonic waves are transmitted behind the vehicle.

After being reflected by an obstacle positioned behind the vehicle, the ultrasonic waves return to the ultrasonic transducer 1. The reflecting surface 121 reflects the returned ultrasonic waves and the ultrasonic vibrator 14 receives the returned ultrasonic waves.

Figure 3:
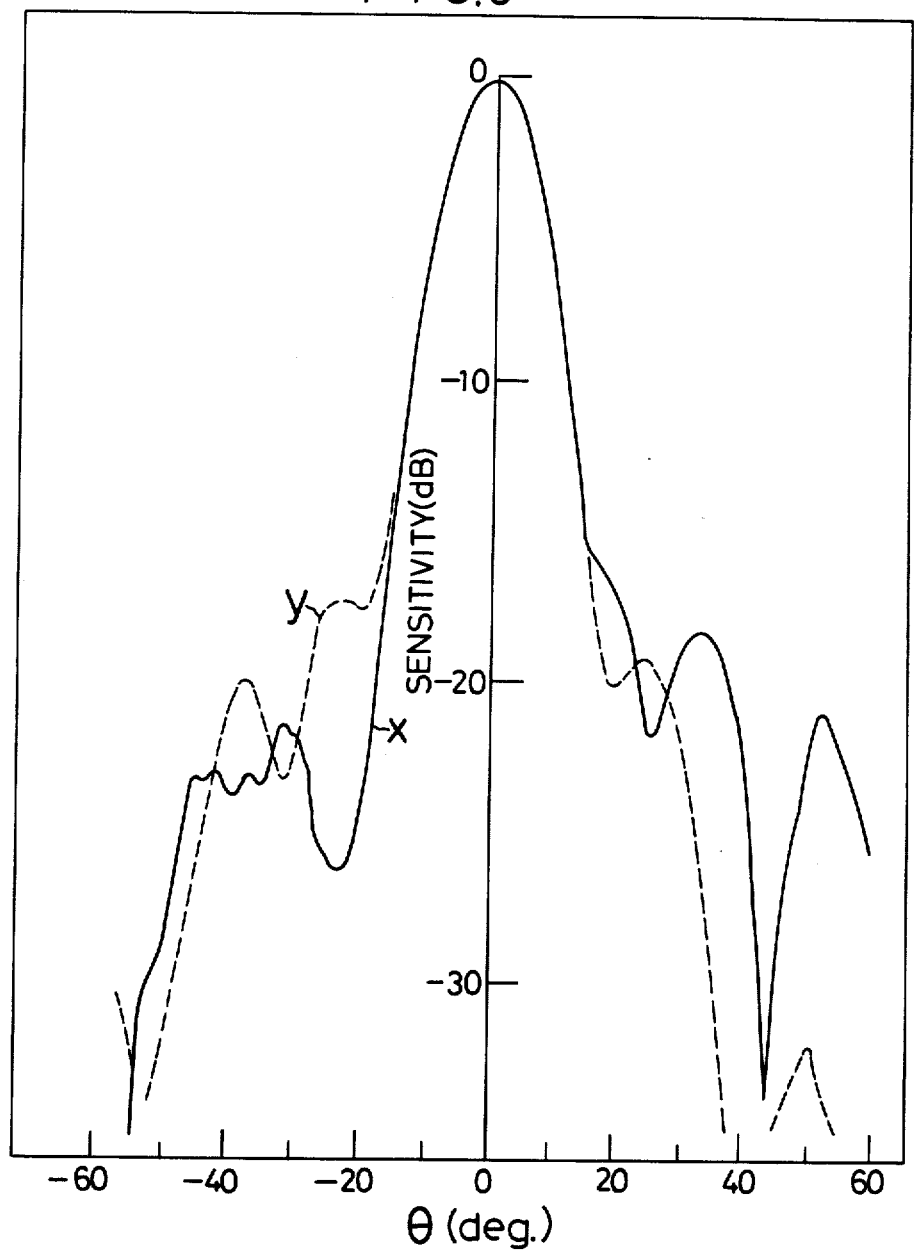

FIG. 3 shows the sensitivity of the ultrasonic transducer of the first embodiment and that of the conventional ultrasonic transducer. In FIG. 3, the line x indicates the sensitivity of the ultrasonic transducer of the present invention and the line y indicates that of the conventional transducer. The abscissa denotes the incident angle of the reflected waves. The negative value of the incident angle shows that the reflected waves enter the transducer from below.

As is apparent from FIG. 3, the ultrasonic transducer generally has the best sensitivity to the reflected waves entering in a horizontal direction parallel to the axial direction of the housing. The conventional transducer has a relatively high sensitivity to the reflected waves entering from below so as to allow misdetection of an object on the road surface as an obstacle to be detected.

The inventors have found that such tendency is caused by the fact that the incident waves entering the housing at angles with respect to the horizontal direction reach the ultrasonic vibrator after being repeatedly reflected by the inner wall of the housing.

According to the present invention, in order to prevent the ultrasonic waves entering from below at angles with respect to the axis of the housing from being reflected in a specific direction as waves of an equal phase, and in order to cancel the ultrasonic waves with each other by the diffraction effect, round rods 16a, 16b, each having a curved surface having a radius of one fourth to five times the wavelength of the ultrasonic waves emitted by the ultrasonic vibrator 14 are secured on the open end portion of the hood 15 as described above.

By providing the round rods 16a, 16b, the sensitivity of the ultrasonic transducer to the ultrasonic waves entering from below can be effectively lowered as shown by the line x in FIG. 2.

Namely, by setting the threshold detecting level of the ultrasonic wave receiving circuit of the obstacle detecting device to about −20 dB, the reflected waves entering the device at 20 degrees or more from below are not detected.

By this structure, tire stopping stones or the like located near the road surface, against which the rear bumper R does not collide, are prevented from being misdetected as obstacles.

As is apparent from FIG. 3, the sensitivity of the ultrasonic transducer of the first embodiment to the ultrasonic waves entering from above is not lowered. This is caused by the fact that the sectional shape of the housing of the ultrasonic transducer of the first embodiment is vertically unsymmetrical as shown in FIG. 1.

The device for detecting obstacles behind a vehicle is required not to misdetect objects on or near the road surface as obstacles to be detected. Therefore, the ultrasonic transducer of the first embodiment, having an especially low sensitivity to the waves entering from below, sufficiently satisfies the above described requirement.

Rain water entering the ultrasonic transducer 1 along the broken line in FIG. 1 rises along the reflecting surface 121 and the greater part thereof is discharged from the long hole 112 while one part thereof collides against the under surface of the retaining member 13 and disperses toward the ultrasonic vibrator 14. The dispersing rain water is blocked by the projecting portion 131 of the retaining member 13 so as not to enter the interior of the groove 132 accomodating the ultrasonic vibrator 14, as shown by the broken arrows.

In this embodiment, the surface 131a of the stopping member 131 fronting the ultrasonic vibrator 14 is made into a smoothly curved surface.

Figure 4:
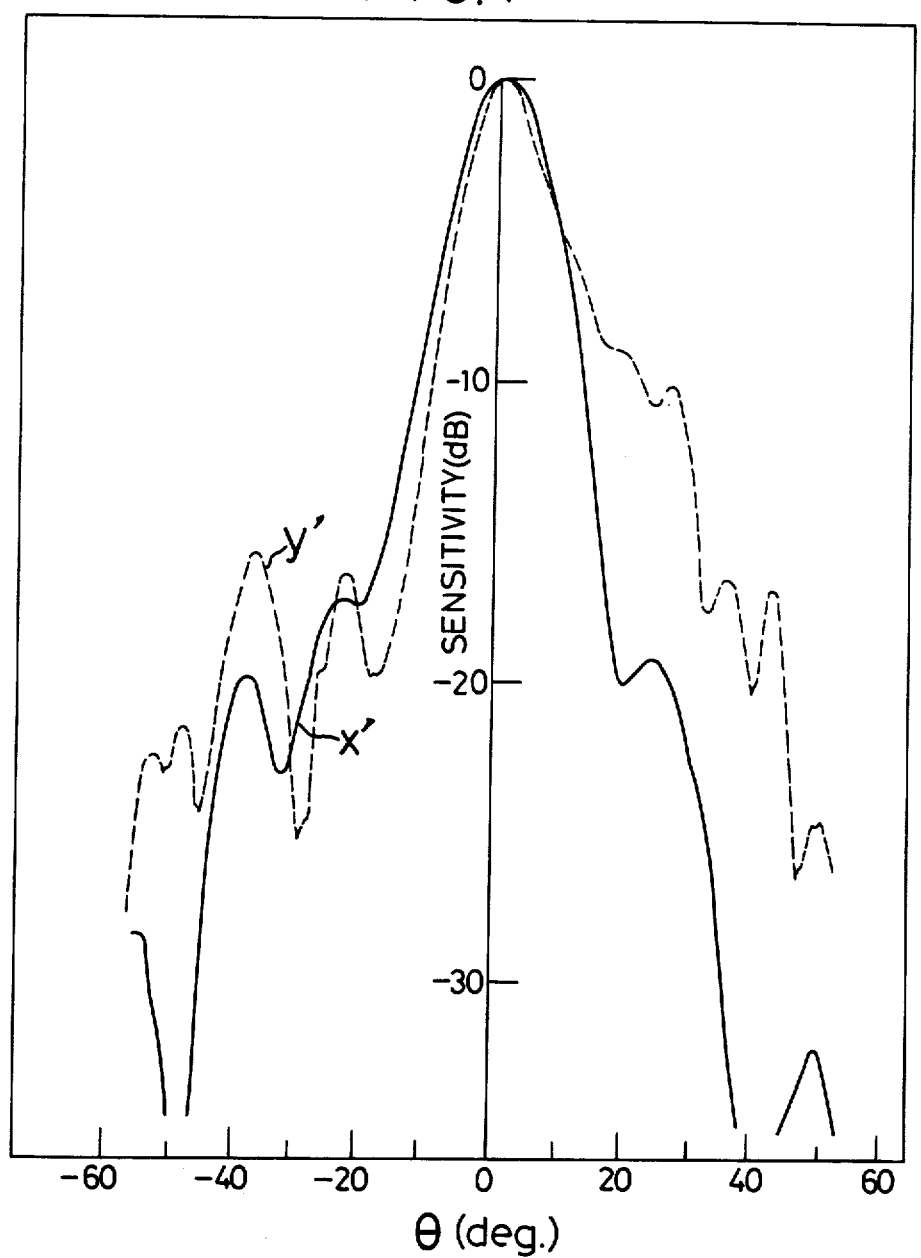

FIG. 4 shows the sensitivity of the ultrasonic transducer having a curved surface 131a and that of the ultrasonic transducer of which the stopping member 131 has a flat surface. The line x' indicates the sensitivity of the ultrasonic transducer having a curved surface 131a while the line y' indicates that of the ultrasonic transducer having the flat surface.

As is apparent from FIG. 4, by forming the stopping member 131 in a smoothly curved surface, the sensitivity to the reflected waves entering from below can be made low.

FIG. 5 shows the second embodiment of the ultrasonic transducer according to the present invention.

In the second embodiment, a plurality of projecting lines 151, each having a smoothly curved saddle-shaped section, are formed on the upper and under inner peripheral surface of the hood 15. Each projecting line has a radius of curvature of one fourth to five times the wavelength of the ultrasonic waves emitted by the vibrator 14. In FIG. 5, a plurality of holes 152 are provided along the projecting lines 151 in a width direction thereof for draining water out of the housing 11.

According to the second embodiment, the sensitivity to the ultrasonic waves entering from below can be made lower as compared with that of the first embodiment. The projecting lines 151 need not be necessarily arranged at equal pitches.

FIG. 6 illustrates a third embodiment of an ultrasonic transducer according to the present invention. In the third embodiment, balls 17 each having a radius of one fourth to five times the wavelength of the ultrasonic waves emitted by the ultrasonic vibrator 14, are secured on each of the upper and lower surfaces of the opening of the hood 15.

The ultrasonic transducer of the third embodiment has the same operational effect as that of the first embodiment. The balls 17 need not be necessarily arranged at equal distances.

Futhermore, the balls 17 may be arranged in the whole upper and under inner surfaces of the hood 15. In this case, more excellent operational effect can be obtained.

In the preceding embodiments, the vertical directivity of the ultrasonic transducer is improved by providing projecting members on the upper and under inner surfaces of the housing along the opening thereof. And the horizontal directivity of the ultrasonic transducer can be similarly improved by providing such projecting members on the left and right inner surfaces of the housing.

As described above, according to the ultrasonic transducer of the present invention, the directivity thereof is improved by reducing the reflection of the ultrasonic waves on the cylindrical wall of the housing by means of the projecting members, each having a smoothly curved surface in the axial direction of the housing, provided on the inner wall of the housing especially along the opening portion thereof. The ultrasonic transducer of the present invention, which is used in the obstacle detecting device of a vehicle, prevents the misdetection of the obstacles behind the vehicle.

What is claimed is:

1. An ultrasonic transducer comprising:
    a housing having an open end and a closed end and an axis running therebetween;
    ultrasonic vibrator means, provided within said housing, for emitting and receiving ultrasonic waves;
    reflecting means, provided within said housing, for reflecting emitted ultrasonic waves toward said open end and reflecting received ultrasonic waves toward said ultrasonic vibrator; and
    projecting member means, provided on an inner wall of said housing, for dispersing and cancelling ultrasonic waves entering said housing at predetermined angles with respect to the axis of said housing, said projecting member being disposed at least along said open end of said housing and having a smoothly curved cross-section along the axis of said housing.

2. An ultrasonic transducer according to claim 1, wherein said reflecting means is disposed at said closed end of said housing and includes a parabolic reflecting surface facing said open end of said housing, and wherein said ultrasonic vibrator means is provided on an upper wall of said housing substantially at a focus of said parabolic reflecting surface.

3. An ultrasonic transducer according to claim 1, wherein said projecting member means comprises a projecting line having a smoothly curved, saddle-shaped cross-section.

4. An ultrasonic transducer according to claim 1, wherein said projecting member means comprises a projecting line having a circular cross-section.

5. An ultrasonic transducer according to claim 1, wherein said projecting member means comprises a plurality of balls arranged at intervals in a direction substantially perpendicular to said axis.

6. An ultrasonic transducer according to claim 1, wherein said smoothly curved surface of said projecting member means has a radius of curvature of substantially one fourth to five times the wavelength of the waves emitted by said ultrasonic vibrator.

7. An ultrasonic transducer according to claim 1, wherein said projecting member means is disposed on upper and under inner walls of said housing along said open end thereof so as to be opposed to each other for dispersing and cancelling ultrasonic waves entering said housing from below at predetermined angles with respect to the axis of the housing.

8. An ultrasonic transducer according to claim 1, wherein said housing is installed within a rear bumper of a vehicle so that said open end is directed behind the vehicle.

9. An ultrasonic transducer according to claim 1, further comprising:
    a rain water stopping member projecting from said upper wall of said housing between an upper end of said reflecting means and said ultrasonic vibrator means so as to separate said reflecting means and said ultrasonic vibrator means from each other to cause rain water entering from said open end of said housing and rising along said reflecting means to be prevented from turning toward said ultrasonic vibrator means.

10. An ultrasonic transducer according to claim 9, wherein said rain water stopping member has a smoothly curved surface facing said ultrasonic vibrator.

* * * * *